(12) United States Patent
Sung et al.

(10) Patent No.: US 12,280,664 B2
(45) Date of Patent: Apr. 22, 2025

(54) APPARATUS FOR DISPLAYING INFORMATION OF DRIVING BASED ON AUGMENTED REALITY

(71) Applicants: Hyundai Motor Company, Seoul (KR); Kia Corporation, Seoul (KR); Hyundai Autoever Corp., Seoul (KR)

(72) Inventors: Tae Hyun Sung, Whasung-Si (KR); Bum Hee Chung, Whasung-Si (KR); Young Jun You, Whasung-Si (KR); Joo Young Lee, Whasung-Si (KR); Dong Chul Lee, Whasung-si (KR)

(73) Assignees: Hyundai Motor Company, Seoul (KR); Kia Corporation, Seoul (KR); Hyundai Autoever Corp., Seoul (KR)

( * ) Notice: Subject to any disclaimer, the term of this patent is extended or adjusted under 35 U.S.C. 154(b) by 770 days.

(21) Appl. No.: 17/462,270

(22) Filed: Aug. 31, 2021

(65) Prior Publication Data
US 2022/0080828 A1 Mar. 17, 2022

(30) Foreign Application Priority Data
Sep. 15, 2020 (KR) .......................... 10-2020-0118478

(51) Int. Cl.
*B60K 35/81* (2024.01)
*B60K 35/00* (2006.01)
*B60K 35/28* (2024.01)
*B60K 35/29* (2024.01)

(52) U.S. Cl.
CPC .............. *B60K 35/00* (2013.01); *B60K 35/28* (2024.01); *B60K 35/29* (2024.01); *B60K 2360/165* (2024.01); *B60K 2360/166* (2024.01); *B60K 2360/177* (2024.01); *B60K 2360/1868* (2024.01); *B60K 2360/188* (2024.01)

(58) Field of Classification Search
CPC .............. B60K 35/00; B60K 2370/165; B60K 2370/188; B60K 2370/177; B60K 2370/1868; B60K 2370/166; G01C 21/365; G01C 21/3492
See application file for complete search history.

(56) References Cited

U.S. PATENT DOCUMENTS

| 2006/0195257 A1* | 8/2006 | Nakamura ......... G01C 21/3632 701/437 |
| 2018/0240258 A1* | 8/2018 | Kosaka ................. B60W 50/14 |
| 2019/0025580 A1* | 1/2019 | Nagano ................ H04N 9/3185 |

(Continued)

*Primary Examiner* — Dalena Tran
(74) *Attorney, Agent, or Firm* — Morgan, Lewis & Bockius LLP

(57) ABSTRACT

A driving information display apparatus may include a processor configured to display driving information depending on a speed limit of a road in augmented reality; and a storage configured to store data and algorithms driven by the processor, wherein the processor is configured to adjust a display form of a display object depending on at least one of a remaining distance to an enforcement point depending on the speed limit of the road, a speeding degree compared to the speed limit, and a speeding degree compared to a user-set speed to display the display object, and the driving information display apparatus is disposed within a vehicle or outside the vehicle, and when disposed outside the vehicle, transmits the driving information to the vehicle or a mobile device.

16 Claims, 13 Drawing Sheets

(56) References Cited

U.S. PATENT DOCUMENTS

2021/0104212 A1* 4/2021 Horihata .................. G06F 3/14
2021/0207971 A1* 7/2021 Kim ...................... G06V 20/58
2022/0084458 A1* 3/2022 Sakuma ............... G09G 3/2096

* cited by examiner

APPARATUS FOR DISPLAYING INFORMATION OF DRIVING BASED ON AUGMENTED REALITY

CROSS-REFERENCE TO RELATED APPLICATION

The present application claims priority to Korean Patent Application No. 10-2020-0118478 filed on Sep. 15, 2020, the entire contents of which is incorporated herein for all purposes by this reference.

BACKGROUND OF THE INVENTION

Field of the Invention

The present invention relates to a driving information display apparatus based on augmented reality, and more particularly, to a technique for displaying driving information related to a means of transportation in an augmented reality form.

Description of Related Art

In general, vehicles (means of transportation) have become essential products in a modern society as their mobility and usability are improved by applying advanced technique, and recently, a head-up display (HUD) has been used to project information onto driver's eyes.

The head-up display is a front display device designed to display driving information related to a means of transportation on front glass of the means of transportation. That is, a head-up display unit is displayed by forming a virtual image such that a driver can recognize various types of information, such as a speed, a fuel level, a temperature, and a warning direction displayed on a vehicle cluster, on windshield glass.

Furthermore, a navigation system is mounted on a recent means of transportation to provide a destination and directions to a driver, and furthermore, in the navigation system to which augmented reality is applied, specific information may be displayed in a form of augmented reality. However, accuracy and diversity of information provided by use of augmented reality in the navigation system is poor.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a driving information display apparatus based on augmented reality, configured for minimizing a sense of heterogeneity and maximizing an emphasis effect on an object by displaying driving information related to a means of transportation based on augmented reality.

The technical objects of the present invention are not limited to the objects mentioned above, and other technical objects not mentioned may be clearly understood by those skilled in the art from the description of the claims.

Various aspects of the present invention are directed to providing a driving information display apparatus, including: a processor configured to display driving information depending on a speed limit of a road in augmented reality; and a storage configured to store data and algorithms driven by the processor, wherein the processor is configured to adjust a display form of a display object depending on at least one of a remaining distance to an enforcement point depending on the speed limit of the road, a speeding degree compared to the speed limit, and a speeding degree compared to a user-set speed to display the display object, and the driving information display apparatus is disposed within a vehicle or outside the vehicle, and when disposed outside the vehicle, transmits the driving information to the vehicle or a mobile device.

In various exemplary embodiments of the present invention, the display form may have a color or a size of the display object.

The processor may partially or entirely change a color of a carpet depending on the remaining distance or the speeding degree, and may display a position of the enforcement point when the remaining distance to the enforcement point is within a predetermined distance.

In various exemplary embodiments of the present invention, the processor may display the display object depending on the remaining distance or the speeding degree by an animation method.

Various aspects of the present invention are directed to providing a driving information display apparatus, including: a processor configured to display a driving direction guidance in augmented reality; and a storage configured to store data and algorithms driven by the processor, the processor displays the driving direction guidance at a display point for the driving direction guidance by estimating the display point, and the driving information display apparatus is disposed within a vehicle or outside the vehicle, and when disposed outside the vehicle, transmits the driving information to the vehicle or a mobile device.

In various exemplary embodiments of the present invention, the processor may defer displaying of the driving direction guidance until a lane of a road is recognized, and may display the driving direction guidance when a target point is included within a range of a determination angle which is determined according to a remaining distance to the target point.

In various exemplary embodiments of the present invention, the processor may display a display object for guiding the target point at a previously defined position or a target position when the remaining distance to the target point is equal to or smaller than a certain level.

In various exemplary embodiments of the present invention, the processor may estimate a geometric line form of a road ahead from a current position of a host vehicle by use of a node and an interpolation point of road information, and may vary and display a display type of the display object upon determining that an obstacle exists between the current position of the host vehicle and the display object for guiding a driving direction of the host vehicle.

In various exemplary embodiments of the present invention, the processor may compare map-matched coordinates with global positioning system (GPS) or dead reckoning (DR) information to estimate an error of the position of the host vehicle compared to map information, and moves a guidance position of the display object by reflecting the error of the position on information on the map.

In various exemplary embodiments of the present invention, the processor may display entry-preventing objects on a road into which erroneous entry of a host vehicle is anticipated, existing within a certain distance or a certain angle from a target exit road when a plurality of adjacent paths exists.

In various exemplary embodiments of the present invention, the processor may determine a display point by moving a predetermined distance along a link of the road into which the erroneous entry is anticipated based on branch points of the paths.

In various exemplary embodiments of the present invention, the processor may display an exit link obtained by determining an average value of an angle perpendicular to an exit angle of the road into which the erroneous entry is anticipated and an exit angle of the target exit road of the host vehicle as an exit angle.

In various exemplary embodiments of the present invention, the processor, when the exit angle of the target exit road is equal to or smaller than a certain level, may amplify an angle of the target exit road compared to a minimum value or an actual exit angle to display it.

In various exemplary embodiments of the present invention, the processor may vary and display an angle with a ground depending on an exit angle of a target exit road.

In various exemplary embodiments of the present invention, the processor may display the angle with the ground to be in parallel when the exit angle is 0 degree and may display the angle with the ground to be perpendicular when the exit angle is 90 degrees.

In various exemplary embodiments of the present invention, the processor may simultaneously display a horizontal or vertical angle when the exit angle is smaller than or equal to a predetermined angle.

In various exemplary embodiments of the present invention, the processor may display the entry-preventing objects as arrows indicating a traveling direction of the target exit road, and may display at least one of the arrows.

In various exemplary embodiments of the present invention, the processor may display both directions of an entry road and an exit road when a difference between an entry angle and an exit angle is larger than a predetermined angle, or when a traveling direction of the target exit road is in a reverse direction, In various exemplary embodiments of the present invention, the processor varies and displays a display type or a display point of a display object according to the remaining distance to the target point or a vehicle speed.

According to the present technique, it is possible to minimize a detect of heterogeneity and maximize an effect of highlighting objects by displaying driving information related to a vehicle based on augmented reality.

Furthermore, various effects which may be directly or indirectly identified through the present document may be provided.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
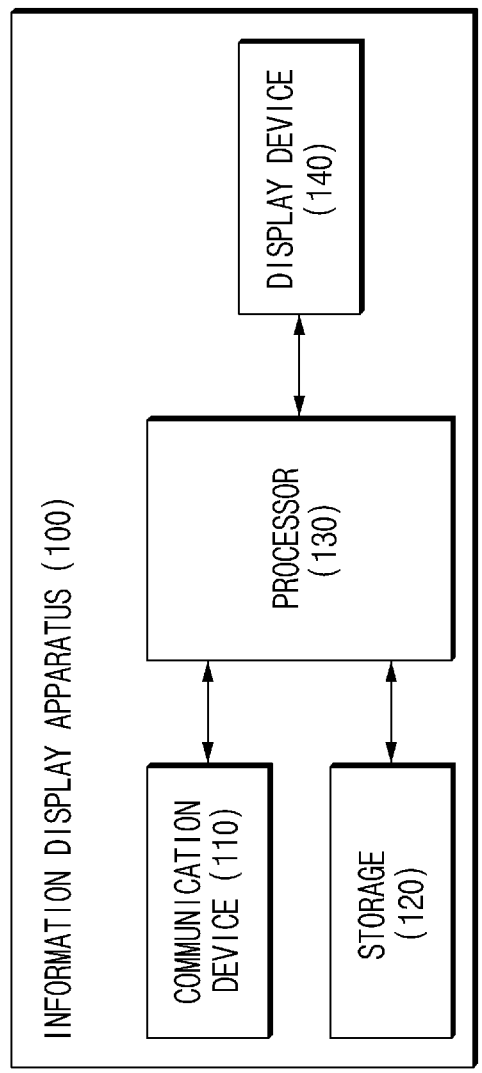
FIG. 1A illustrates a block diagram showing a configuration of a driving information display apparatus based on augmented reality according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, some exemplary embodiments of the present invention will be described in detail with reference to exemplary drawings. It may be noted that in adding reference numerals to constituent elements of each drawing, the same constituent elements have the same reference numerals as possible even though they are indicated on different drawings. Furthermore, in describing exemplary embodiments of the present invention, when it is determined that detailed descriptions of related well-known configurations or functions interfere with understanding of the exemplary embodiments of the present invention, the detailed descriptions thereof will be omitted.

In describing constituent elements according to various exemplary embodiments of the present invention, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the Field of the Invention to which various exemplary embodiments of the present invention pertains (those skilled in the art) unless they are differently defined. Terms defined in a generally used dictionary shall be construed to have meanings matching those in the context of a related art, and shall not be construed to have idealized or excessively formal meanings unless they are clearly defined in the exemplary embodiment of the present invention.

Hereinafter, various exemplary embodiments of the present invention will be described in detail with reference to FIG. 1A to FIG. 8C.

Figure 1B:
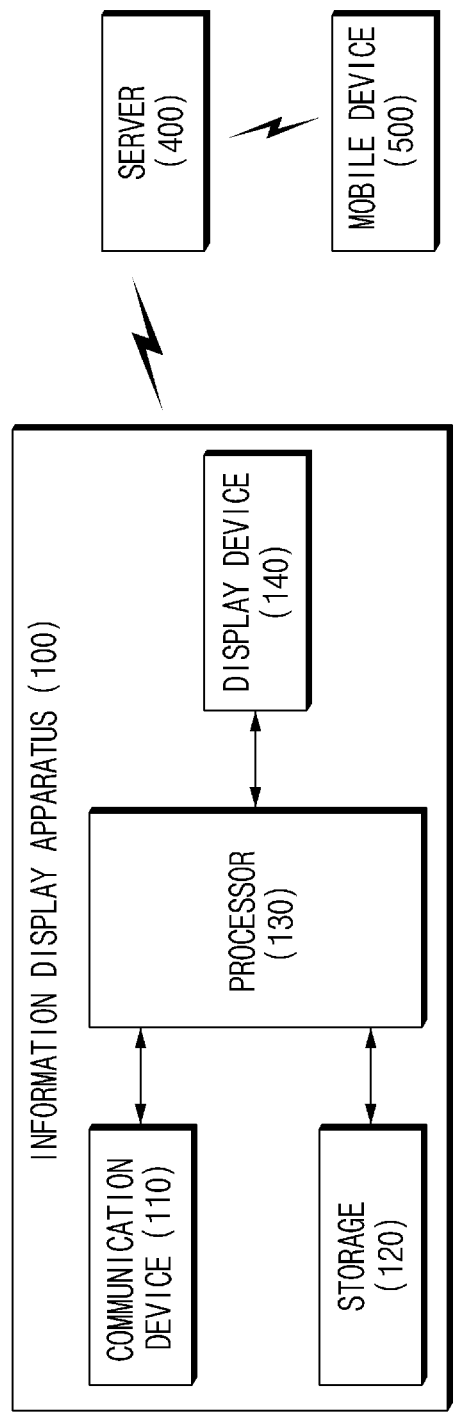
FIG. 1B illustrates a block diagram showing a configuration of a driving information display apparatus based on augmented reality according to various exemplary embodiments of the present invention.

FIG. 1A illustrates a block diagram showing a configuration of a driving information display apparatus of a means of transportation according to various exemplary embodiments of the present invention, and FIG. 1B illustrates a block diagram showing a configuration of a driving information display apparatus of a means of transportation according to various exemplary embodiments of the present invention.

The means of transportation may include a four-wheeled means of transportation, such as a vehicle or a truck, a two-wheeled means such as a motorcycle or a bicycle, and all movable means such as an aircraft or a ship, the driving information display apparatus may display information such as a destination, a stopover area, a point of interest (POI), and a driving state of a means of transportation, and may be implemented as a navigation system, an audio video navigation (AVN), or the like.

The driving information display apparatus 100 according to the exemplary embodiment of the present invention may be implemented inside a means of transportation. In the instant case, as illustrated in FIG. 1A, the driving information display apparatus 100 may be integrally formed with internal control units of the means of transportation, and may be implemented as a separate device to be connected to the control units of the means of transportation by a separate connecting means. Furthermore, the driving information display apparatus 100 may be configured in a form of a server 400 outside the means of transportation as illustrated in FIG. 1B, and when positioned outside the means of transportation, the server 400 transmits and displays driving information to the in-vehicle display device 100 or the mobile device 500. In the instant case, the mobile device 500 may include all mobile communication terminals having a display device, such as a smart phone, a personal digital assistant (PDA), a portable multimedia player (PMP), a digital camera, a portable game machine, an MP3 player, a smart key, a tablet PC, as a user terminal. When driving information is transmitted from an outside of the vehicle to the vehicle, it may be transmitted from a device or a server outside the vehicle to an in-vehicle device, and the in-vehicle device may include, e.g., a cluster, a head-up display, a navigation terminal, an audio, a video, a navigation (AVN), and the like.

Furthermore, the driving information display apparatus 100 in various exemplary embodiments of the present invention may be applied to an autonomous driving control vehicle including, e.g., advanced driver assistance systems (ADAS), smart cruise control (SCC), and forward collision warning (FCW).

The driving information display apparatus 100 may display guide coordinates, which indicate a position of a target which is accessible by the means of transportation, and may also display auxiliary information related to display coordinates, which indicate an actual position of the target.

Furthermore, the driving information display apparatus 100 may select guide coordinates, which indicate a position of a target corresponding to a point of interest (POI), which is accessible by the means of transportation, as a position of the POI, to display POI information at the selected position thereof.

Furthermore, the driving information display apparatus 100 may display information related to an area which is not displayable or difficult to display because it is out of view or is covered by an obstacle in a displayable area in augmented reality.

Furthermore, the driving information display apparatus 100 may adjust a moving speed or a size of the target displayed in an augmented reality form depending on a relative position of the target.

According to the exemplary embodiment of the present invention, the driving information display apparatus 100 which is operated as the above may be implemented in a form of an independent hardware device including a memory and a processor that processes each operation, and may be driven in a form included in other hardware devices such as a microprocessor or a general purpose computer system.

Referring to FIG. 1A, the driving information display apparatus 100 of the means of transportation may include a communication device 110, a storage 120, a processor 130, and a display device 140.

The communication device 110, which is a hardware device implemented with various electronic circuits to transmit and receive signals through a wireless or wired connection, may perform V2I communication by use of an in-vehicle network communication technique or a wireless Internet access or short range communication technique with servers, infrastructure, and other means of transportations outside the means of transportation in various exemplary embodiments of the present invention. Herein, in-vehicle communication may be performed through controller area network (CAN) communication, local interconnect network (LIN) communication, or flex-ray communication as the in-vehicle network communication technique. Furthermore, the wireless communication technique may include wireless LAN (WLAN), wireless broadband (Wibro), Wi-Fi, Worldwide Interoperability for Microwave Access (WiMAX), etc. Furthermore, short-range communication technique may include Bluetooth, ZigBee, ultra wideband (UWB), radio frequency identification (RFID), infrared data association (IrDA), and the like.

As an example, the communication device 110 may receive traffic information, road information, information for display based on augmented reality, and the like from an external server.

The storage 120 may store information received by the communication device 110, data obtained by the processor 130, data and/or algorithms required for the processor 130 to operate, and the like. In the instant case, the information received by the communication device 110 may include position information related to the means of transportation and driving information (speeding information, vehicle speed information, route information, etc.) of the means of transportation for display based on augmented reality.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 130 may be electrically connected to the communication device 110, the storage 120, and the like, may electrically control each component, and may be an electrical circuit that executes software commands, performing various data processing and determinations described below. The processor 130 may be, e.g., an electronic control unit (ECU), a micro controller unit (MCU), or other sub-controllers mounted in the means of transportation.

When displaying driving information related to the means of transportation based on augmented reality, the processor 130 may improve user's recognition and minimize the sense of heterogeneity.

The processor 130 may display speeding information associated with a speed limit (speeding control information). That is, the processor 130 may output warning information when a warning is required because the means of transportation violates laws or when attention to a surrounding environment is required.

The processor 130 may adjust a display form of a display object depending on at least one of a remaining distance to an enforcement point depending on the speed limit of the road, a speeding degree compared to the speed limit, and a speeding degree compared to a user-set speed.

Figure 2:
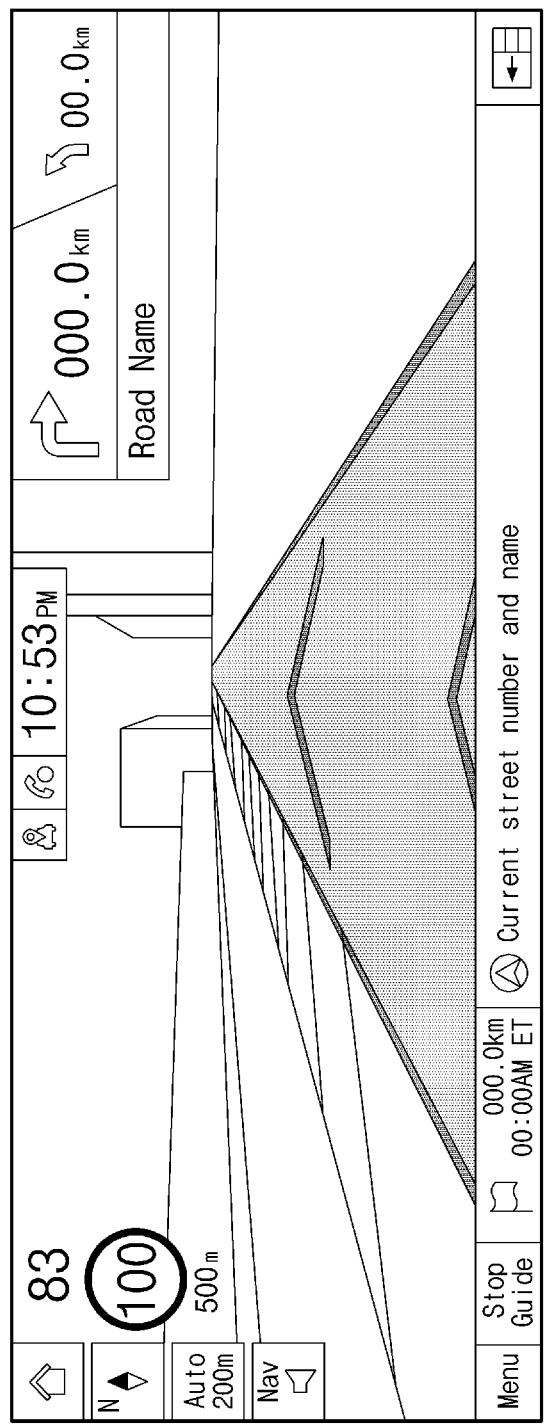
FIG. 2 illustrates an example of a screen displaying speeding information based on augmented reality according to various exemplary embodiments of the present invention.

When the vehicle speeds above a certain level compared to a current speed limit of the road, the processor 130 may warn against such speeding. Accordingly, the processor 130 may provide a warning by partially or entirely changing a color of a carpet, and in some cases, may provide a warning in a form of animation. Furthermore, the processor 130 may change and display the color of the carpet depending on a remaining distance and a speeding degree. FIG. 2 illustrates an example of a screen displaying speeding information based on augmented reality according to various exemplary embodiments of the present invention. As illustrated in FIG. 2, a carpet indicating a road surface may be displayed with a predetermined color, a driving direction may be displayed, and a speed limit and a current speed of the means of transportation may be displayed in an upper left corner.

Furthermore, when the means of transportation enters within a predetermined distance from an enforcement point, the processor 130 may help a user to prepare for a sudden deceleration by displaying position information related to the enforcement point. Furthermore, the processor 130 may provide state information by adjusting a size of information which is currently displayed depending on a speeding degree. For example, the processor 130 may allow a user to intuitively recognize the speeding degree by varying and displaying a size of an enforcement camera object depending on the speeding degree.

In the past, when speeding information was displayed, limited information was provided by displaying only a current vehicle speed and coloring it. The processor 130 in various exemplary embodiments of the present invention may display speeding information by changing a color or a size of a partial or entire portion of the object and performing animation depending on the distance remaining to the enforcement point or the current speeding level, etc. for a specific object (e.g., a carpet, an enforcement camera, etc.).

The processor 130 may enhance direction guidance display based on augmented reality.

Accordingly, the processor 130 in various exemplary embodiments of the present invention may display a dynamic wall as an entry preventing object for preventing erroneous entry.

The processor 130 may display direction guidance, may estimate and display a display point of the direction guidance by use of lane information, and may display a display direction based on a road direction thereof.

Conventionally, direction information was simply displayed, and a position is not accurate due to limitation of a SD map and inaccuracy of vehicle position estimation, and thus in some cases, direction information could not be accurately displayed at a target guiding position. That is, in the case of using the SD map, since position accuracy is not sufficient, there may be a case where the means of transportation is positioned differently from a geometric line form of a road. Accordingly, the processor 130 may increase accuracy by estimating a display point by use of lane information in addition to map information. That is, when a lane is recognized, the processor 130 may assume that a direction of the recognized lane is the same as a direction of a road, and may move it to a target position in the direction of the lane to determine a display point.

Furthermore, conventionally, when the road is bent, the display point is behind an obstacle, but a virtual object is drawn in front of the obstacle, so that it is displayed as if the virtual object is in front of the obstacle, or when measures are taken to solve a position problem, a time point at which the object was drawn may be delayed or the display may not be displayed. Furthermore, in the past, when the display is performed in a direction with a small angle, it was often difficult to recognize information in the direction thereof.

Accordingly, the processor 130 in various exemplary embodiments of the present invention may increase accuracy of a display position by displaying a display object when a target point falls within a predetermined range by use of a screen display angle or a separate determination angle. It is possible to minimize a probability that the target point behind a building overlaps in front of the building on an irregular road or a sharply curved road. In the instant case, a determination angle, which is an angle to determine a range of the target point, may be determined depending on a remaining distance, and the processor 130 may store a fixed value in the storage 120 to use it, or may vary and use the determination angle depending on the remaining distance.

However, when the road has curvature or a current lane is not recognized, a following method is used.

First, the processor 130 suspends the display until a lane is recognized. Furthermore, the processor 130 may reduce a probability of displaying the display object at a point which is different from the target position by adjusting the determination angle depending on a remaining distance to the target point. Furthermore, when the remaining distance to the target point is smaller than a certain level, the processor 130 may reduce a phenomenon in which guidance information is omitted or displayed late by immediately displaying the display object at a previously defined location or the target position.

The processor 130 may estimate a position of a host vehicle and estimate a position of the display object through road information modeling. The processor 130 may estimate a geometric line form of a road ahead from the current position of the host vehicle by use of a node or an interpolation point of road information, and may correct the display position accordingly.

Furthermore, the processor 130 may estimate the geometric line form of the road, and may determine whether to display it when there is an obstacle between the position of the host vehicle and the display object. Furthermore, when there is an obstacle between the position of the host vehicle and the display object, the processor 130 may improve a sense of heterogeneity on the display by varying a display state (e.g., color, transparency, etc.).

Furthermore, the processor 130 may compare map-matched coordinates with a value using global positioning system (GPS) or dead reckoning (DR) information to estimate an error of the position of the host vehicle compared to map information, and may move the guidance position by reflecting the error of the position on information on the map.

Figure 3:
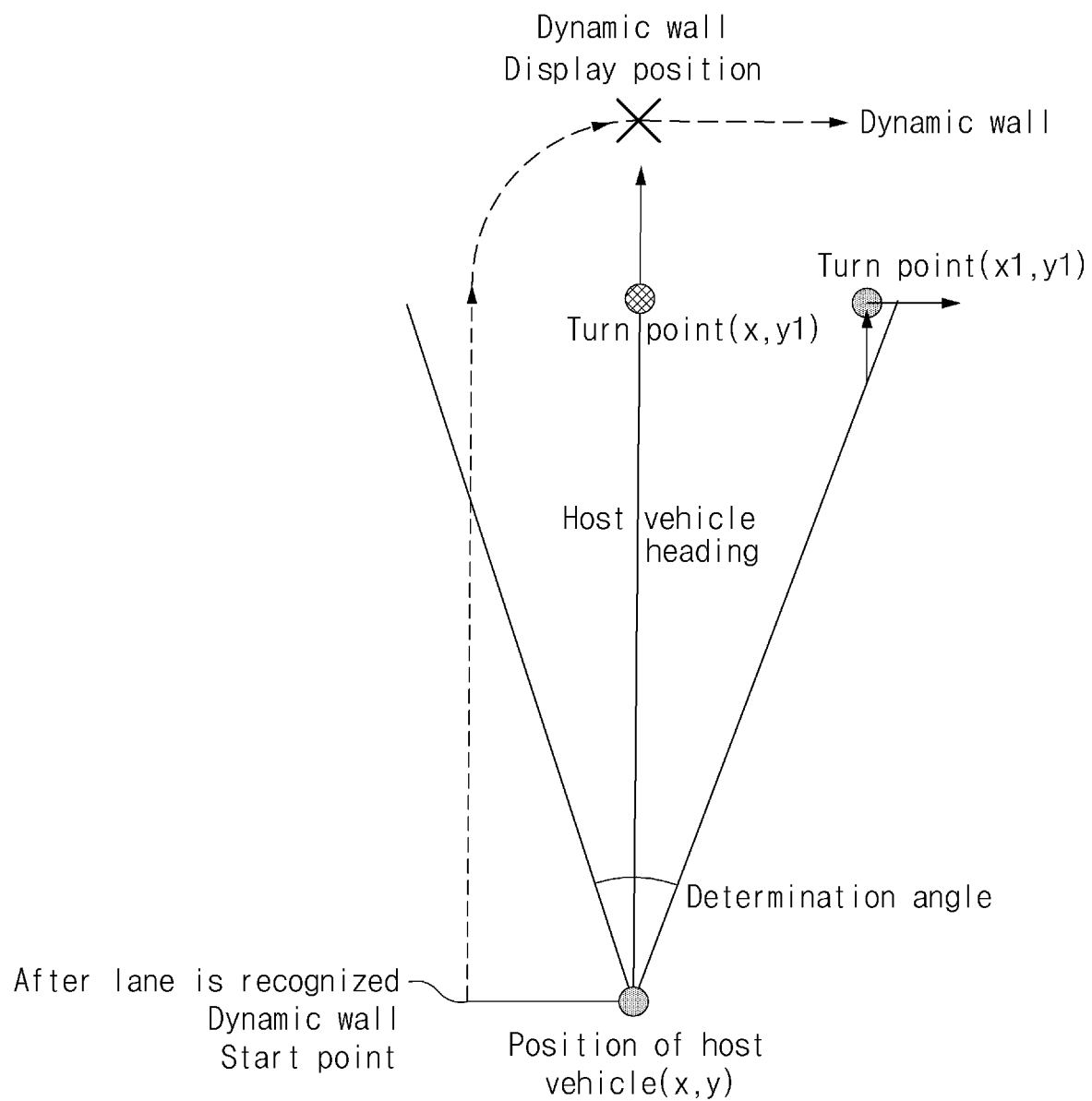
FIG. 3 illustrates a diagram for describing a method for displaying a dynamic wall according to various exemplary embodiments of the present invention.

FIG. 3 illustrates a diagram for describing a method for displaying a dynamic wall according to various exemplary embodiments of the present invention.

Referring to FIG. 3, the processor 130 recognizes a turn point (rotation point) (x1, y1) within a determination angle from a position of a host vehicle.

The processor 130 generates a dynamic wall at a position which is a predetermined distance away from the position of the host vehicle or in a recognized lane. The dynamic wall is generated along the recognized lane, and a quarter circle is drawn at a point where a turn point and a y-axis value are similar, and then displayed on an x-axis of the host vehicle (x mark).

In the instant case, a moving direction of the dynamic wall may be determined in consideration of an entry angle and an exit angle, or the exit angle, and a final displayed direction of the dynamic wall becomes the exit angle based on a true north of the turn point. In the instant case, a turn point (x1, y1) may be corrected to a turn point (x, y1).

The processor 130 may display a wall, which is an object for preventing erroneous entry into a road into which the erroneous entry may be made.

Conventionally, in the case where direction guidance is performed, there are cases in which it is difficult to recognize guidance information when an error in position information occurs or a display angle is small by displaying guidance information at a corresponding position on a path. For example, information such as a 1-o'clock direction and a 2-o'clock direction is difficult to recognize a difference in a 3D.

When there is another road adjacent to the exit road, a user may enter another adjacent road. When there is a lot of crossroads such as $3^{rd}$, $5^{th}$, $6^{th}$ streets, there is a high possibility of entering another road adjacent to the road.

Figure 4A:
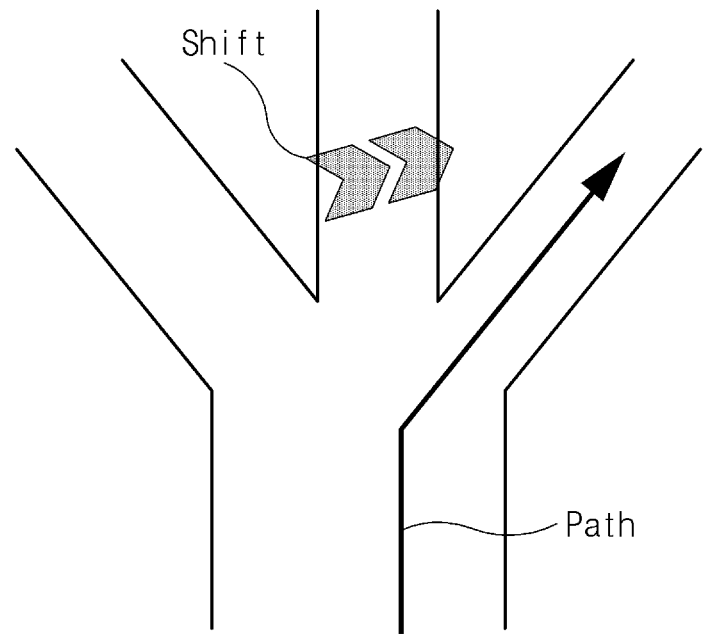
FIG. 4A, FIG. 4B, FIG. 4C, FIG. 4D and FIG. 4E illustrate an example of a screen for guiding a direction based on augmented reality according to various exemplary embodiments of the present invention.
Figure 4B:
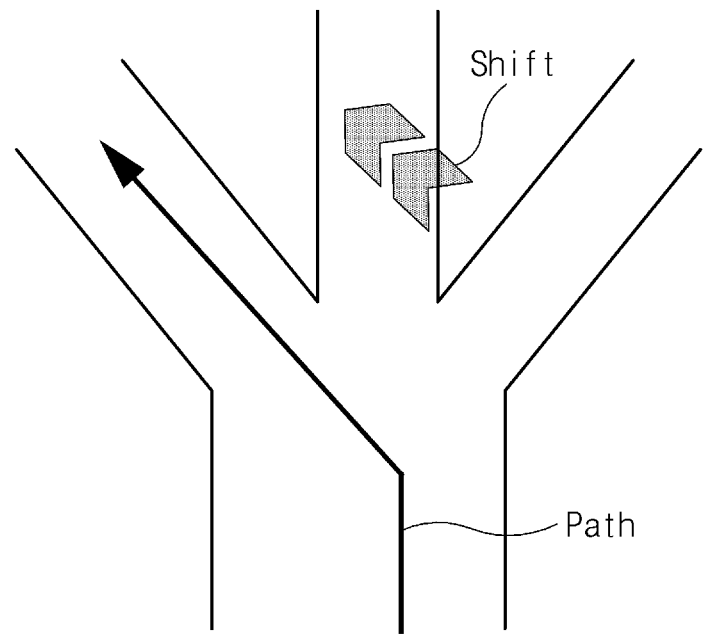

Accordingly, the processor 130 in various exemplary embodiments of the present invention performs a display for preventing entry to an adjacent road which is smaller than a certain distance or smaller than a certain angle from the exit road. In FIG. 4A, an example of displaying an entry-preventing object (shift) on an intermediate crossroad when a moving path of the host vehicle is a rightmost among three crossroads is disclosed, and in FIG. 4B, an example of displaying an entry-preventing object (shift) on an intermediate crossroad when a moving path of the host vehicle is a leftmost among three crossroads is disclosed.

Figure 4C:
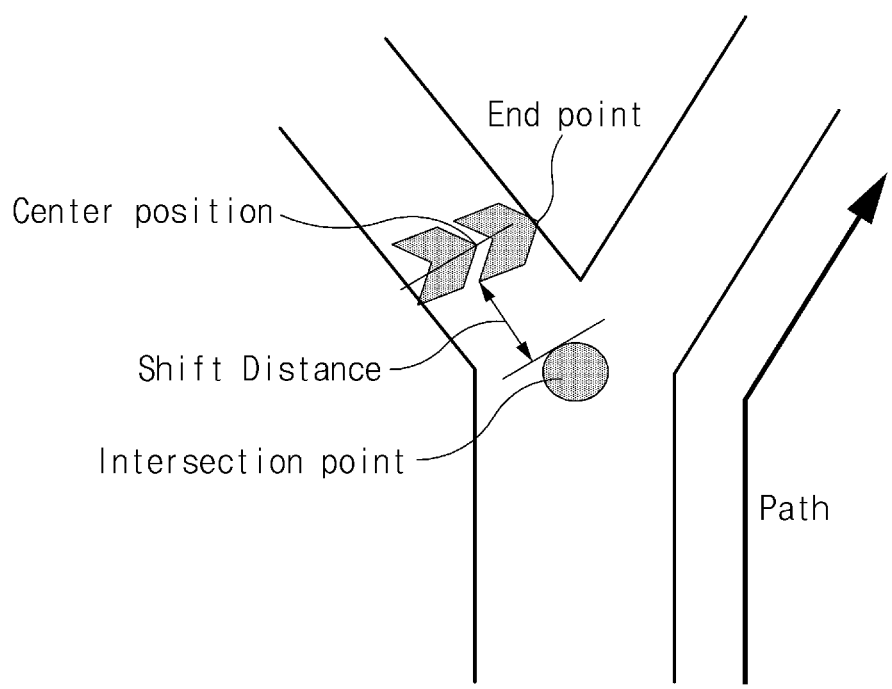

The processor 130 may follow the road on a map to estimate a display position for a road where there is a concern about erroneous entry, and then may select a display point after moving a certain distance. That is, the processor 130 may display an entry preventing object at a position of beginning of the road where there is the concern about the erroneous entry. That is, the processor 130 may select a display point by moving a certain distance along a link of the road where there is the concern about the erroneous entry based on a branch point, and then may display an intersection point as an entry preventing object at the corresponding display point. Accordingly, an adjacent road and a target road may be distinguished. As illustrated in FIG. 4C, the entry preventing object may be displayed at the beginning of the road where there is the concern about the erroneous entry.

Furthermore, as illustrated in FIG. 4C, the processor 130 may display an intersection with respect to the road where there is the concern about the erroneous entry at an angle which is perpendicular to an exit angle of the corresponding road or at an angle which is different from the exit angle. In the instant case, the exit angle indicates an angle of an exit direction based on the host vehicle.

Figure 4D:
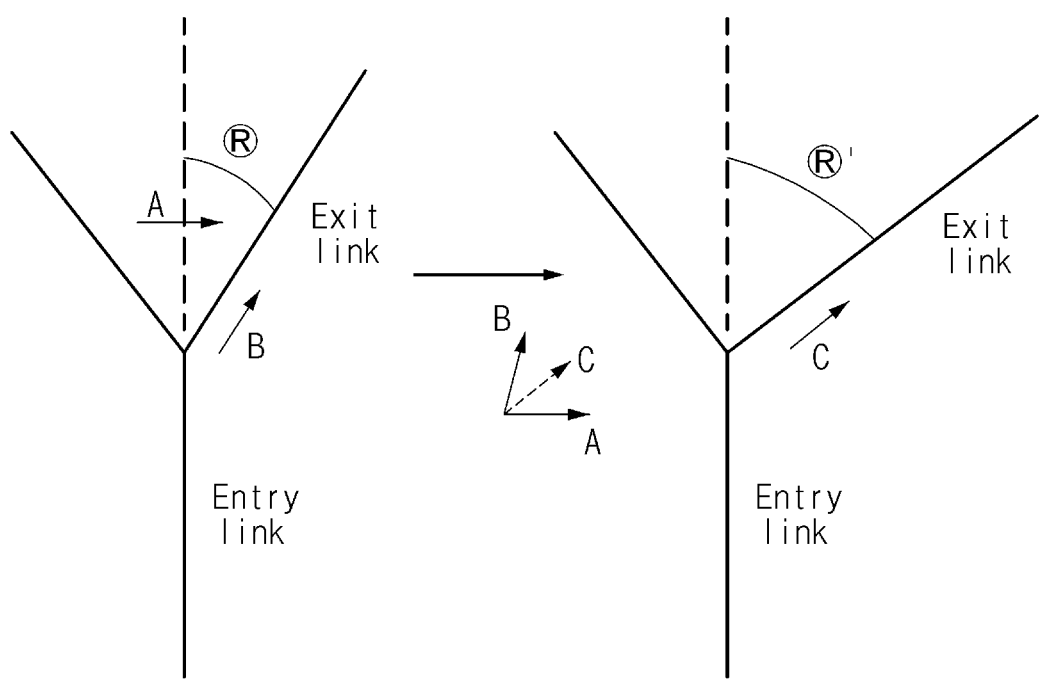

The processor 130 displays a mixture of an angle perpendicular to the exit angle of the road where there is the concern about the erroneous entry and an exit angle B of an exit road targeted by the host vehicle, to display an angle considering the exit road on the road where there is the concern about the erroneous entry. For example, as illustrated in FIG. 4D, when an exit is made from a Y-shaped branch road in a right direction thereof, the processor 130 may determine an exit angle C in the right direction by determining an average value of an exit angle B of a right-directional link and an angle A which is perpendicular to an entry link based on the host vehicle. For example, it is possible to prevent the erroneous entry by displaying the exit link C farther from the road where there is the concern about the erroneous entry than the original exit link B. In the instant case, an angle ⓡ' of the entry link and the exit link C is greater than an angle ⓡ of the entry link and exit link B.

Figure 4E:
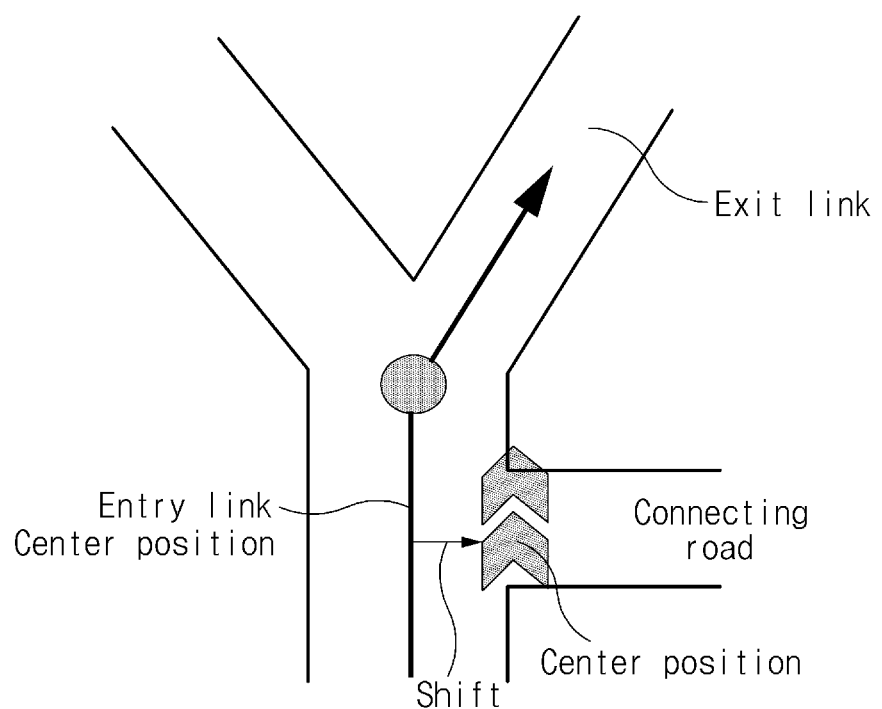

Furthermore, as illustrated in FIG. 4E, when an alleyway in a same direction exists just before a guide point of a right turn, a user may erroneously enter the alleyway. Even in such a case, it is possible to reduce a possibility of user's erroneous entry by displaying guidance information on a road with a possibility of erroneous entry.

When the exit angle of the exit road is smaller than a predetermined angle (e.g., 10 degrees), it is difficult to recognize three-dimensional graphics and directions, so angle adjustment is necessary.

Accordingly, in the case where a forward direction is assumed to be 0 degree relative to an entry direction or a direction in which the host vehicle travels, when the exit angle is separated by a certain distance in a clockwise direction and there is no other road adjacent in a same direction for a case of having a predetermined angle or less, the processor 130 improves recognition of a user by performing the display at a guidance display angle that has a minimum value or is amplified than an actual road angle.

Accordingly, the processor 130 may variably display an angle through comprehensive determination of a surrounding road and the exit angle, and actively display information in a range which is not confused with other roads. Furthermore, in some cases, when the exit angle is equal to or smaller than a certain level, the processor 130 may amplify and display a corresponding value, helping the user's recognition.

Figure 5:
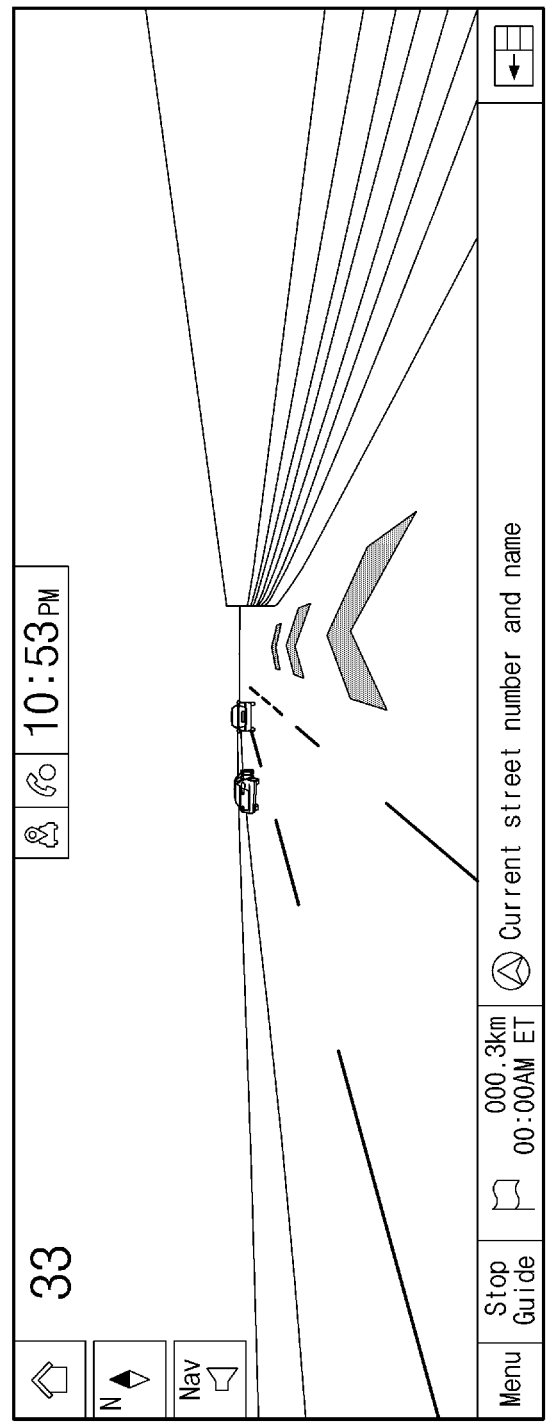
FIG. 5 illustrates an example of a screen an example screen for guiding a direction horizontally with a road based on augmented reality according to various exemplary embodiments of the present invention.

In the case of displaying a three-dimensional graphic, the processor 130 may be difficult to recognize it depending on an angle of direction display, and thus a horizontal or vertical angle may be varied and applied. FIG. 5 illustrates an example screen for guiding a direction horizontally with a road based on augmented reality according to various exemplary embodiments of the present invention. As illustrated in FIG. 5, the processor 130 may display information horizontally with the road in the case of an exit direction smaller than a certain angle.

Furthermore, the processor 130 may display an angle with a ground to be variable depending on the exit angle, and may display an upright direction by displaying the angle with the ground to be in parallel (0 degrees) in the case where the exit angle is 0 degree when a front is set to 0 degree and by displaying the angle with the ground to be perpendicular (90 degrees) in the case where the exit angle relative to the front is 90 degrees.

Furthermore, the processor 130 may overcome a limitation of recognizing direction information by simultaneously displaying a horizontal or vertical angle (in the form of a letter L) in the case of an exit angle which is smaller than or equal to a predetermined angle.

Accordingly, the processor 130 may display an exit direction of a certain angle or less horizontally or substantially horizontally, or may display an erected degree to be variable according to the exit angle.

The processor 130 may display a plurality of direction guidances for a same point or adjacent points. That is, if necessary, the processor 130 may display multiple direction indications to prevent erroneous entry and clearly display direction information.

When there is little difference between exit angles on a three-branch road, a display position and a display angle may not be accurate depending on inaccuracy of a map, a position of the host vehicle, and the like. In the instant case, the processor 130 may display an indication for preventing entry into an adjacent road into which erroneous entry may be made, helping to enter a target road. In the instant case, the adjacent road may include left/right or more roads of a target exit road, and the processor 130 may display a plurality of direction informations on some or all of the roads.

Figure 6A:
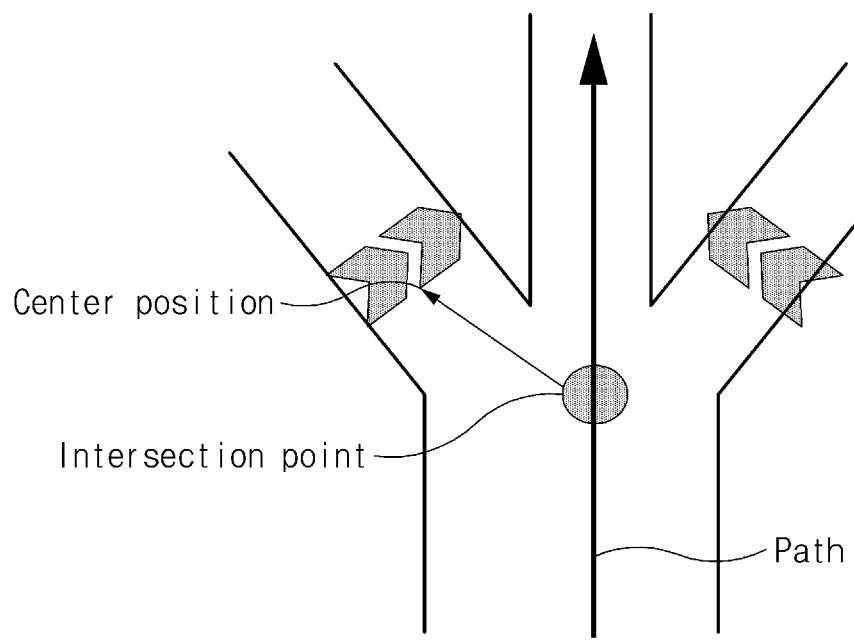
FIG. 6A and FIG. 6B illustrate an example of a screen for guiding a plurality of directions based on augmented reality according to various exemplary embodiments of the present invention.
Figure 6B:
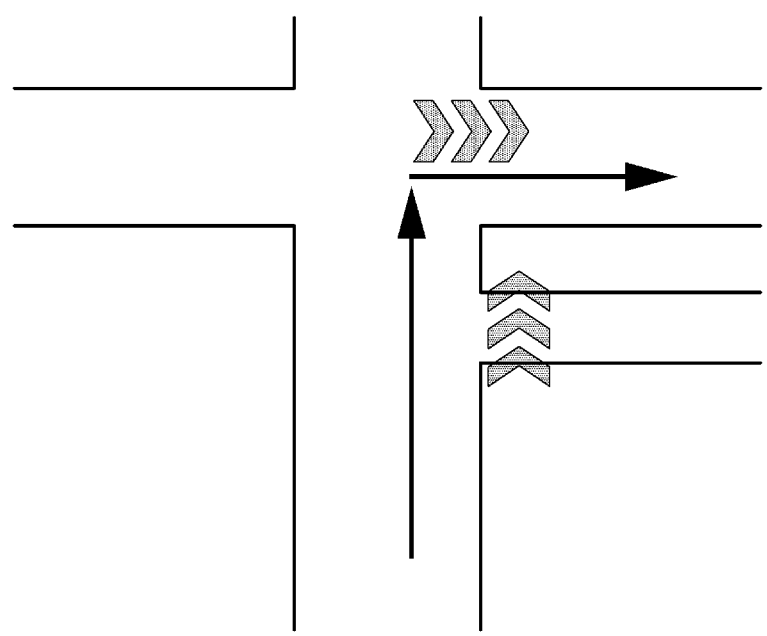

FIG. 6A and FIG. 6B illustrate an example of a screen for guiding a plurality of directions based on augmented reality according to various exemplary embodiments of the present invention. In FIG. 6A, when a middle road of the three-branch road is the target exit road and opposite roads thereof are roads into which erroneous entry may be made, entry-preventing objects may be displayed on the opposite roads into which erroneous entry may be made, and in the instant case, the entry-preventing objects are displayed to face the target exit road to enable several arrows to point to the target exit road at the same time. In FIG. 6B, the entry-preventing objects are displayed on an alleyway into which erroneous entry may be made when a vehicle turns right at an intersection. As illustrated in FIG. 6B, all of the entry-preventing objects are displayed to surface a direction of the target exit road.

Conventional direction guidance information is difficult to provide sufficient information at points such as u-turn when only information in one direction may be displayed or guidance may be performed using angle information only in an exit direction by displaying entry and exit angles at all times, and an indication may be inaccurate because unnecessary information is provided or information that does not match the real world is provided when the entry and exit angles are always displayed.

Figure 7A:
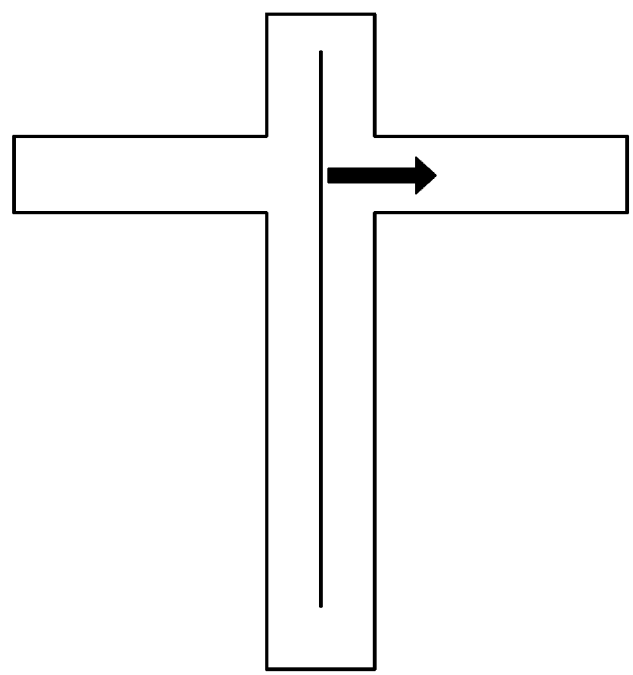
FIG. 7A, FIG. 7B, and FIG. 7C illustrate views for describing a method of determining a reference for a display length based on augmented reality according to various exemplary embodiments of the present invention.
Figure 7B:
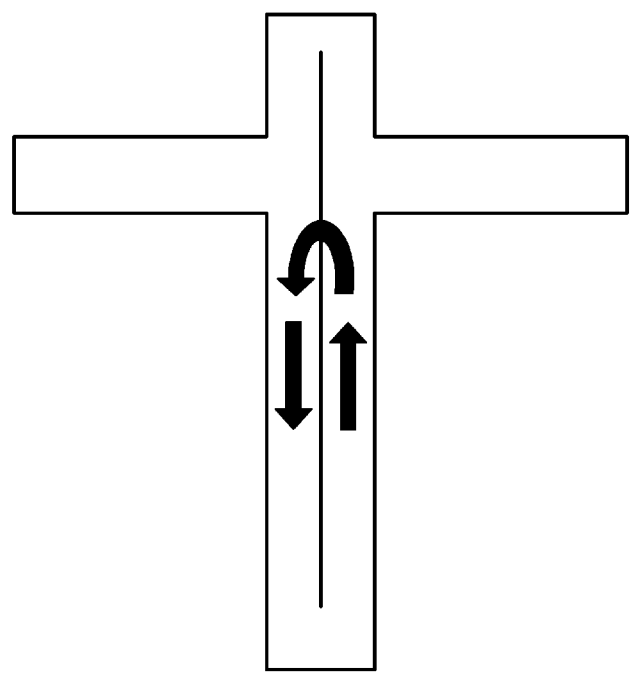
Figure 7C:
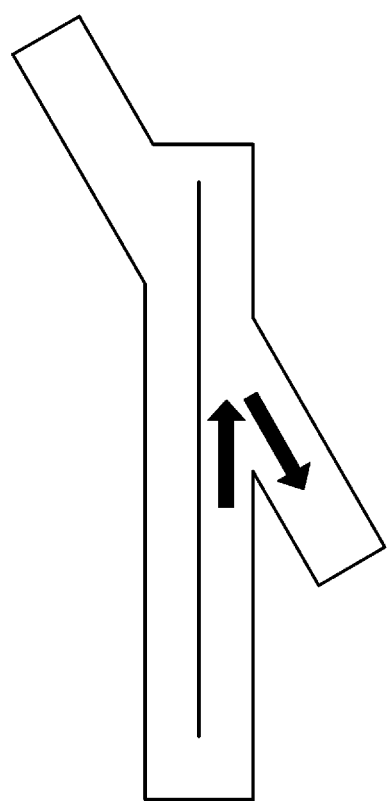

FIG. 7A, FIG. 7B, and FIG. 7C illustrate views for describing a method of determining a reference for a display length based on augmented reality according to various exemplary embodiments of the present invention. FIG. 7A illustrates an indication of angle information related to the exit direction thereof, but when there is a big difference between the entry and exit angles, which is greater than a predetermined difference, such as a U-turn, or they are in a reverse direction thereof, both the entry angle and the exit angle are displayed to favor direction recognition as illustrated in FIG. 7B and FIG. 7C. In the instant case, the entry angle indicates an angle in the entry direction based on the host vehicle.

Furthermore, in the case of u-turn, the processor 130 displays directions of both the entry road and the exit road to perform direction display.

Since it is difficult for the processor 130 to recognize an exit angle between 90° and 270° in the clockwise direction based on the front, both the entry and exit angles may be displayed to supplement direction recognition.

Figure 8A:
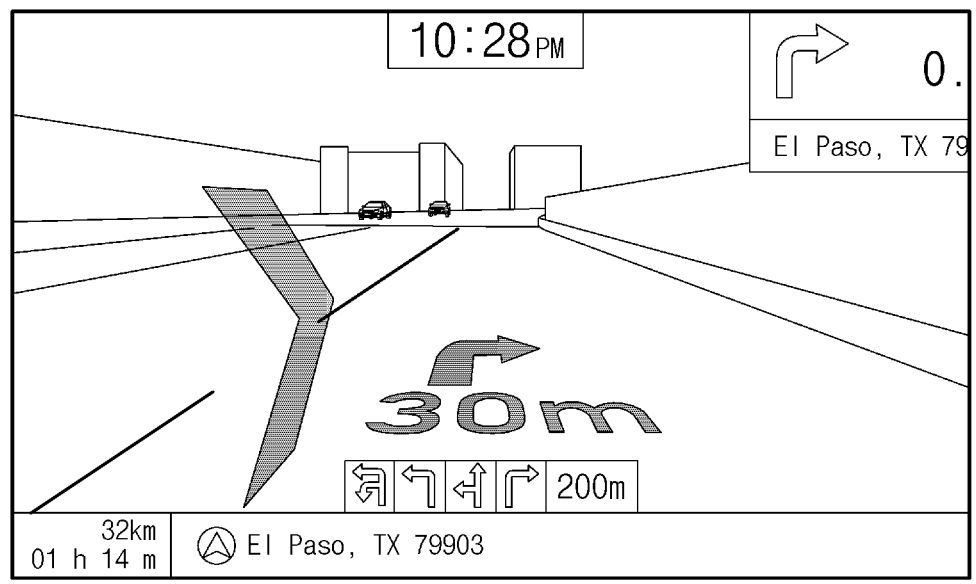
FIG. 8A, FIG. 8B and FIG. 8C illustrate an example of a screen to which animation based on augmented reality is applied according to various exemplary embodiments of the present invention.
Figure 8B:
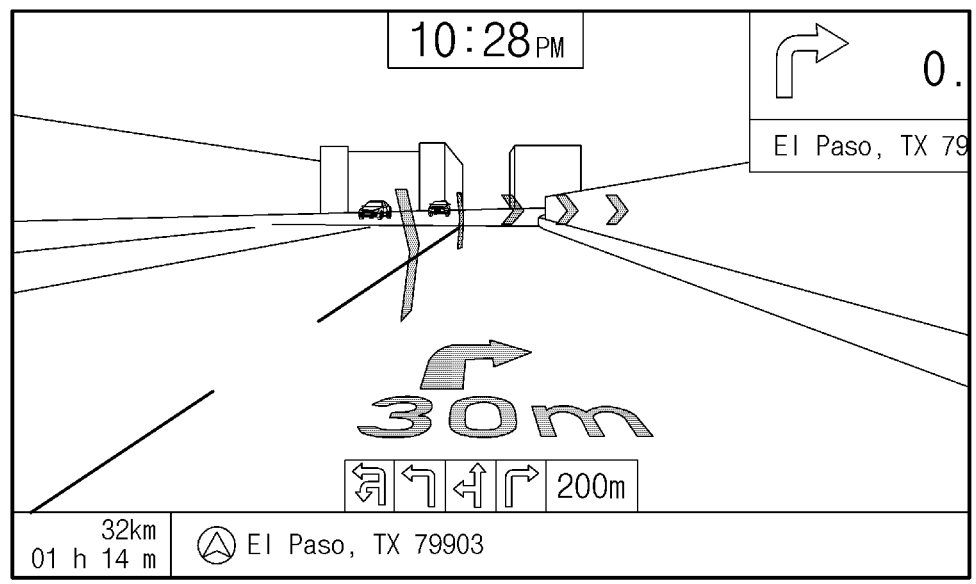

In the past, it was difficult to recognize perspective by simply displaying information at a target point. Accordingly, the processor 130 in various exemplary embodiments of the present invention applies an animation in which an object moves to the target point to provide information related to the perspective, ameliorating distortion of the perspective. FIG. 8A and FIG. 8B illustrate an example of a screen to which animation based on augmented reality is applied according to various exemplary embodiments of the present invention.

In the present way, the processor 130 may apply the animation in which the object moves to the target point to provide the information related to the perspective to a user before completion of display. That is, a user may estimate the perspective of each section by use of a change amount through the animation.

When an animation is applied, there is a time to perform the animation, and thus when a remaining distance is short or when a vehicle speed is equal to or greater than a certain level, a time for displaying information to be completed and providing the information may be insufficient for the user. Accordingly, the processor 130 may enable a time for providing information to be sufficiently secured by varying a display type or a display time point depending on the remaining distance or the vehicle speed. For example, the processor 130 may advance and display a display time or adjust a number of display times depending on a remaining distance to secure an information providing time, and may also cancel an animation method in which information display is slow and display it in a general augmented reality method When an inter-vehicle distance of a smart cruise control (SCC) system is set, it may be difficult to recognize information related to a currently set value on a general map. That is, setting of the SCC inter-vehicle distance determines steps depending on user's preference. However, even at a same step, the distance may vary depending on a vehicle speed or a surrounding environment, so it may be difficult for a user to recognize a level which is appropriate for the user when adjusting the step.

Figure 8C:
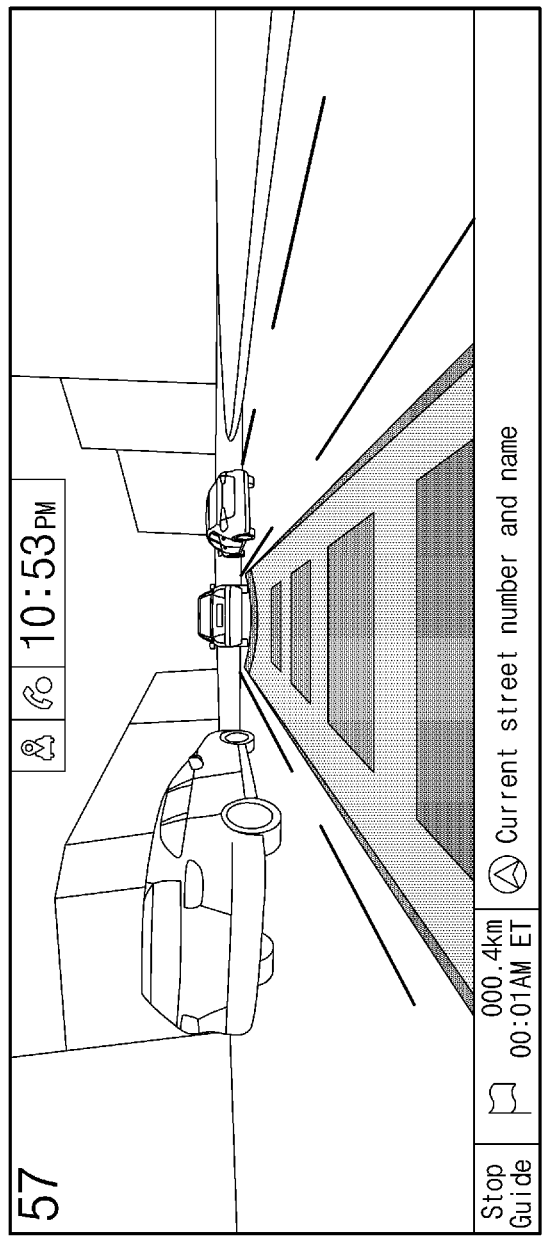

Accordingly, the processor 130 may display a step-by-step distance for setting the inter-vehicle distance based on augmented reality as illustrated in FIG. 8C. FIG. 8C illustrates an example of a screen to which an animation for each step of an inter-vehicle distance based on augmented reality is applied according to various exemplary embodiments of the present invention. For example, in the case of step 4 of the SCC system, a predetermined inter-vehicle distance may be displayed in step 4 of the SCC system. However, even in step 4 of the SCC system, the inter-vehicle distance may vary depending on a vehicle speed or a road grade.

Accordingly, when the inter-vehicle distance changes depending on the vehicle speed or the road grade, processor 130 may update the changed inter-vehicle distance information to display the inter-vehicle distance information differently. For example, in step 4 of the SCC system, when the vehicle speed is low, the inter-vehicle distance is set to be smaller than a predetermined distance (e.g., 10 m), and when the vehicle speed is high in same step 4 of the SCC system, the inter-vehicle distance may be set to be greater than a predetermined distance (e.g., 40 m). Accordingly, a change in the inter-vehicle distance depending on the change in vehicle speed information may be applied to an augmented reality display.

Furthermore, when a same inter-vehicle distance setting value is set as ranges depending on the vehicle speed or the road grade, the processor 130 may include all of the ranges to display them. For example, in the case of a second-step inter-vehicle distance setting value, a range of 10 m to 60 m may be displayed, and in the case of a fourth-step inter-vehicle distance setting value, a range of 20 m to 120 m may be displayed.

The display device 140 may be controlled by the processor 130 to display driving information based on augmented reality. As an example, the display device 140 may be implemented as a head-up display (HUD), a cluster, an audio video navigation (AVN), or a human machine interface (HMI). Furthermore, the display device 140 may include at least one of a liquid crystal display (LCD), a thin film transistor liquid crystal display (TFT LCD or thin film transistor-LCD), a light emitting diode (LED) display, an organic light emitting diode (OLED or organic LED) display, an active OLED (AMOLED or active matrix OLED) display, a flexible display, a bended display, and a 3D display. Some of these displays may be implemented as a transparent display formed of a transparent or translucent type such that the outside may be viewed. Furthermore, the display device 140 may be provided as a touch screen including a touch panel, and may be used as an input device as well as an output device.

Accordingly, according to various exemplary embodiments of the present invention, speeding information may be displayed in a form of augmented reality in connection with speeding control information, and user convenience may be increased by adjusting and displaying a color or size of an object depending on a speeding degree and the remaining distance, etc.

Furthermore, according to various exemplary embodiments of the present invention, direction guidance may be displayed in various ways while driving based on augmented reality. That is, according to various exemplary embodiments of the present invention, it is possible to minimize a recognition limit by increasing accuracy by estimating the display point based on the lane information in addition to map information, by displaying entry-preventing objects for roads into which erroneous entry may be made, by adjusting an angle and displaying it when the exit angle of the target exit road is small, and by displaying the display object depending on the exit direction of the road.

Furthermore, according to various exemplary embodiments of the present invention, it is possible to improve user's visibility by varying a length of a direction-indicating object, and displaying a movement, a remaining distance, vehicle speed information, and the like of the display object by an animation method.

The above description is merely illustrative of the technical idea of the present invention, and those skilled in the art to which various exemplary embodiments of the present invention pertains may make various modifications and variations without departing from the essential characteristics of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A driving information display device comprising:
   a processor configured to display a driving direction guidance in augmented reality; and
   a storage configured to store data and algorithms driven by the processor,
   wherein the processor is configured to display the driving direction guidance at a display point for the driving direction guidance by estimating the display point, and
   wherein the driving information display apparatus is disposed outside a vehicle, and transmits the driving information to the vehicle or a mobile device.

2. The driving information display device of claim 1,
   wherein the processor is configured to defer displaying of the driving direction guidance until a lane of a road is recognized, and
   wherein the processor is configured to display the driving direction guidance when a target point is included within a range of a determination angle which is determined according to a remaining distance to the target point.

3. The driving information display device of claim 2, wherein the processor is configured to display a display object for guiding the target point at a previously defined position or a target position when the remaining distance to the target point is equal to or smaller than a predetermined level.

4. The driving information display device of claim 2, wherein the processor is configured to display both directions of an entry road and an exit road when a difference between an entry angle and an exit angle is larger than a predetermined angle, or when a traveling direction of the target exit road is in a reverse direction.

5. The driving information display device of claim 2, wherein the processor varies and displays a display type or a display point of a display object according to the remaining distance to the target point or a vehicle speed.

6. The driving information display device of claim 1, wherein the processor is configured to estimate a geometric line form of a road ahead from a current position of a host vehicle by use of a node and an interpolation point of road information.

7. The driving information display device of claim 6, wherein the processor varies and displays a display type of a display object upon determining that an obstacle exists between the current position of the host vehicle and the display object for guiding a driving direction of the host vehicle.

8. The driving information display device of claim 7, wherein the processor is configured to compare map-matched coordinates with global positioning system (GPS) or dead reckoning (DR) information to estimate an error of a position of the host vehicle compared to map information, and moves a guidance position of the display object by reflecting the error of the position on information in a map.

9. The driving information display device of claim 1, wherein the processor is configured to display entry-preventing objects on a road into which erroneous entry of a host vehicle is anticipated, existing within a predetermined distance or a predetermined angle from a target exit road when a plurality of adjacent paths exists.

10. The driving information display device of claim 9, wherein the processor is configured to determine the display point by moving a predetermined distance along a link of the road into which the erroneous entry is anticipated based on branch points of the paths.

11. The driving information display device of claim 10, wherein the processor is configured to display an exit link obtained by determining an average value of an angle perpendicular to an exit angle of the road into which the erroneous entry is anticipated and an exit angle of the target exit road of the host vehicle as an exit angle.

12. The driving information display device of claim 9, wherein the processor is configured to display the entry-preventing objects as arrows indicating a traveling direction of the target exit road, and displays at least one of the arrows.

13. The driving information display device of claim 1, wherein the processor, when an exit angle of a target exit road is equal to or smaller than a predetermined level, amplifies an angle of the target exit road compared to a minimum value or an actual exit angle to display the angle of the target exit road.

14. The driving information display device of claim 1, wherein the processor varies and displays an angle with a ground depending on an exit angle of a target exit road.

15. The driving information display device of claim 14, wherein the processor is configured to display the angle with the ground to be in parallel when the exit angle is 0 degree and displays the angle with the ground to be perpendicular when the exit angle is 90 degrees.

16. The driving information display device of claim 15, wherein the processor simultaneously displays a horizontal or vertical angle when the exit angle is smaller than or equal to a predetermined angle.

* * * * *